US012453639B2

(12) United States Patent
Park

(10) Patent No.: US 12,453,639 B2
(45) Date of Patent: Oct. 28, 2025

(54) BIO-FLEXIBLE SPINAL IMPLANT HAVING DETACHABLE HEAD MODULE AND ASSEMBLY THEREOF

(71) Applicant: Kyung-Woo Park, Seoul (KR)

(72) Inventor: Kyung-Woo Park, Seoul (KR)

( * ) Notice: Subject to any disclaimer, the term of this patent is extended or adjusted under 35 U.S.C. 154(b) by 136 days.

(21) Appl. No.: 18/495,753

(22) Filed: Oct. 27, 2023

(65) Prior Publication Data

US 2025/0064596 A1 Feb. 27, 2025

(30) Foreign Application Priority Data

Aug. 25, 2023 (KR) .......................... 10-2023-0111721

(51) Int. Cl.
*A61B 17/70* (2006.01)
*A61F 2/44* (2006.01)
*A61B 17/86* (2006.01)

(52) U.S. Cl.
CPC ............ *A61F 2/44* (2013.01); *A61B 17/7002* (2013.01); *A61B 17/7035* (2013.01); *A61B 17/7076* (2013.01); *A61B 2017/8655* (2013.01)

(58) Field of Classification Search
CPC ............ A61B 17/7002; A61B 17/7005; A61B 17/7004; A61B 17/7011; A61B 17/7019; A61B 17/7026; A61B 17/7028; A61B 17/7032; A61B 17/7034; A61B 17/7035; A61B 17/7037
See application file for complete search history.

(56) References Cited

U.S. PATENT DOCUMENTS

| 2004/0015166 A1* | 1/2004 | Gorek ................ A61B 17/7004 606/261 |
| 2005/0137594 A1* | 6/2005 | Doubler ................ F16B 35/005 606/264 |

(Continued)

FOREIGN PATENT DOCUMENTS

| JP | H8-252265 A | 10/1996 |
| JP | 2001-505469 A | 4/2001 |

(Continued)

OTHER PUBLICATIONS

Office Action for Korean Patent Application No. 10-2023-0111721 issued by the Korean Patent Office on Jun. 4, 2024.

(Continued)

*Primary Examiner* — Ellen C Hammond
(74) *Attorney, Agent, or Firm* — IP & T GROUP LLP

(57) ABSTRACT

The present invention relates to an assembly of a spinal implant having a detachable head module, in which the head module is manufactured by being modularized by seating an inner lock in a seating hole of a housing in vitro before a main operation, and fixing a spring rod, which may be connected for each segment, to the housing in a state in which a direction and angle of the rod is adjusted, and the head module is coupled to an anchor fixed in advance to a vertebral body during the main operation, such that spinal implantation may be easily and conveniently performed without requiring a process of forcibly bending or accurately aligning the rod in accordance with an alignment line of the anchor. The present invention provides a spinal implant having a detachable head module.

17 Claims, 11 Drawing Sheets

(56) References Cited

U.S. PATENT DOCUMENTS

| | | | |
|---|---|---|---|
| 2006/0064090 A1* | 3/2006 | Park | A61B 17/7005 606/259 |
| 2007/0088359 A1* | 4/2007 | Woods | A61B 17/7049 606/86 A |
| 2007/0100341 A1* | 5/2007 | Reglos | A61B 17/7023 606/86 A |
| 2008/0183215 A1* | 7/2008 | Altarac | A61B 17/7005 606/301 |
| 2008/0287998 A1* | 11/2008 | Doubler | A61B 17/7037 606/301 |
| 2009/0287254 A1* | 11/2009 | Nayet | A61B 17/7037 606/264 |
| 2009/0306720 A1* | 12/2009 | Doubler | A61B 17/7037 606/301 |
| 2010/0125302 A1* | 5/2010 | Hammill, Sr. | A61B 17/7035 606/301 |
| 2011/0238119 A1* | 9/2011 | Moumene | A61B 17/7028 606/264 |
| 2013/0211454 A1* | 8/2013 | Beger | A61B 17/701 606/255 |
| 2015/0196336 A1* | 7/2015 | Whipple | A61B 17/8625 606/312 |
| 2015/0305779 A1* | 10/2015 | Montavon | A61B 17/7001 606/279 |
| 2017/0319236 A1* | 11/2017 | Spitler | A61B 17/7043 |
| 2020/0060732 A1 | 2/2020 | van der Pol | |
| 2023/0000526 A1* | 1/2023 | Follini | A61B 17/7037 |
| 2023/0301689 A1* | 9/2023 | Allen | A61B 17/7037 |
| 2024/0008902 A1* | 1/2024 | Jackson | A61B 17/7032 |
| 2024/0260999 A1* | 8/2024 | Park | A61B 17/7028 |

FOREIGN PATENT DOCUMENTS

| | | |
|---|---|---|
| JP | 2007-167658 A | 7/2007 |
| JP | 2008-513174 A | 5/2008 |
| JP | 2008-539821 A | 11/2008 |
| JP | 2013-526374 A | 6/2013 |
| KR | 10-2006-0027240 A | 3/2006 |
| KR | 10-1389407 B1 | 5/2014 |
| KR | 10-1868694 B1 | 6/2018 |

OTHER PUBLICATIONS

Office Action for Japanese Patent Application No. 2023-185256 issued by the Japanese Patent Office on Dec. 18, 2024.

* cited by examiner

Enlarged "B"

BIO-FLEXIBLE SPINAL IMPLANT HAVING DETACHABLE HEAD MODULE AND ASSEMBLY THEREOF

CROSS-REFERENCE TO RELATED APPLICATIONS

This application claims priority to and the benefit of Korean Patent Application No. 10-2023-0111721 filed in the Korean Intellectual Property Office on Aug. 25, 2023, the entire contents of which are incorporated herein by reference.

TECHNICAL FIELD

The present invention relates to a bio-flexible spinal implant and a continuous connection assembly thereof that are configured to fix an injured or deformed spine by using spring rods that may be connected for each segment and screw, and more particularly, to a bio-flexible spinal implant and an assembly thereof that each have a detachable head module capable of conveniently and simply performing spinal implant surgery by using the head module that is modularized by separating an anchor and a head which constitute a screw, and assembling a spring rod, in the head in a state in which a direction and angle of the spring rod which may be connected for each segment are adjusted.

BACKGROUND ART

In general, the spine consists of 24 bones (excluding sacrum and coccyx which are fused segments), which are connected by joint segments, in which discs are located between each joint. By this configuration, the spine not only maintains a posture of a human being while performing a cushioning action and supports a body weight and a posture corresponding to loads applied by various angles, but also serves as a basis for motion and to protect internal organs. However, when the spine is damaged or deformed due to artificial factors such as external shock, a degenerative change, or an abnormal posture lasting for a long time, severe pain is caused by compressing nerves passing through a spinal canal or an intervertebral foramen. When these degenerative diseases have progressed beyond a certain level, surgery should be performed so that the damaged or deformed parts of the spinal segments do not press or compress the nerves.

Representative spinal degenerative diseases include spinal stenosis, spondylolisthesis, spondylolysis, etc., accompanied by intersegmental instability, and these degenerative diseases have been treated through spinal fusion surgery using a spinal fixation apparatus.

The spinal fusion using the spinal fixation apparatus will be briefly described with reference to FIGS. 1 and 2.

FIG. 1 is a perspective view illustrating a configuration of a spinal fixation apparatus according to the related art, and FIG. 2 is a schematic diagram illustrating the spinal fixation apparatus according to the related art mounted on a spinal segment.

As illustrated in FIG. 1, the spinal fixation apparatus according to the related art includes a U-shaped receiving groove 301a, a head part 301 having a female thread formed on an inner circumferential surface of the receiving groove 301a, a screw pike 300 having a screw 302 inserted into a pedicle and inserted into the damaged spinal segment, a rod 310 connecting each of the screw pikes 300 to fix a pedicle, a set screw 320 fastened to a female thread formed in the receiving groove 301a to fix the rod 310 and having a wrench insertion groove 320a formed thereon.

As illustrated in FIG. 2, in the spinal fixation apparatus according to the related art, the screw 302 of the screw pike 300 is inserted into and fixed to each pedicle and the rod 310 is seated in the U-shaped receiving groove 301a formed in the head part 301, and then, is fixed with the set screw 320.

The surgical procedure, which treats the spine disease by using the pedicle fixing device in the related art configured as described above, is one of the most complicated and difficult surgical procedures. When there are various malformations or deformities, trauma, or vertebral fractures, the surgeon will attempt to "fuse" the vertebrae together. In this case, screws are mounted on the pedicle, and a rigid or semi-rigid rod is used to connect the vertebrae (usually two or more vertebrae).

However, because of the complexity of human anatomy, most surgeons perform a process of disposing the screw on two or more non-aligned pedicles, forcibly deforming a straight rigid rod so that the rod conforms to the alignment line of the screw, and then coupling the rod with the screw in order to appropriately stabilize a pedicle screw assembly in a patient's body. Therefore, this situation eventually degrades the rigidity of the rod. When a patient is exposed to a load applied at various angles on the process of repetitive low back exercises such as extension and flexion after surgery, a problem in that the rod bends or fractures occurs.

In order to solve the above-mentioned problems, there have been proposed, as the related arts, a polyaxial pedicle screw assembly disclosed in U.S. Pat. No. 7,862,594 B2 (hereinafter, referred to as 'Patent Document 1'), and a polyaxial pedicle screw system disclosed in U.S. Patent Application Publication No. US20040158247 A1 (hereinafter, referred to as 'Patent Document 2'). These patent documents each disclose a structure in which a screw nail and a head are separated, such that a rigid rod may be aligned to conform to an alignment line of screw without being deformed. The patent documents will be more specifically described below.

As illustrated in FIG. 3A, Patent Document 1 provides a structure including: a screw nail 202 having a spherical socket groove 204 formed at an upper end thereof; a head part 212 having an accommodation portion 212a configured to accommodate a rod 216 and having a spherical body 214 having a plurality of cut-out grooves 214a formed in a lower portion thereof so that the head part 212 may be fitted into the spherical socket groove 204 and freely turned; a saddle pin 218 fixed to the spherical socket groove 204 while penetrating the spherical body 214 and configured to prevent the spherical body 214 from being withdrawn during a process in which the spherical body 214 turns; and a set screw 220 configured to fix the rod 216 in the accommodation portion 212a. The structure is configured such that after the screw nail 202 is inserted into the pedicle, the spherical body 214 of the head part 212 is fitted into the spherical socket groove 204 and then fixed by the saddle pin 218, and the rod 216 is seated in the accommodation portion 212a of the head part 212, in order that the spherical body 214 may freely turn in the spherical socket groove 204.

As illustrated in FIG. 3B, Patent Document 2 provides a structure including: a head part 232 having a screw thread 232a formed on an outer peripheral surface thereof and having an accommodation portion 232b having a through-hole formed vertically therethrough; a screw nail 236 including a threaded portion configured to be inserted into a vertebral body while passing through the through-hole of the head part 232, and a spherical body 238 provided on an upper portion of the threaded portion and having a wrench groove 238a provided in the through-hole; a washer 242 having an aspherical groove formed in a bottom portion thereof so that the washer 242 may turn in a state of being in close contact with a surface of the spherical body 238; a rod 244 placed on an upper portion of the washer 242; a set screw 246 fastened to the accommodation portion 232b of the head part 232 and having a wrench groove 246b at a center thereof in order to fix the rod 244 to the head part 232; and a nut 248 having a screw thread 248a formed on an inner peripheral surface thereof and fastened to the screw thread 232a of the head part 232.

In Patent Documents 1 and 2, the rods 216 and 244 are each manufactured as a predetermined single piece provided in the form of a rigid straight bar regardless of various spinal shapes of each patient and a position of the pedicle, which causes many difficulties in connecting the rod to the pedicle screw. That is, in case that the pedicle screw inserted between the vertebral segments are not uniformly aligned, the rods are fixed with the position aligned after angles of the head parts 212 and 232 are arbitrarily adjusted by spherical motions of the socket groove portions 204 and 242 and the spherical bodies 214 and 238 coupled to the head parts 212 and 232 about the screw nails 202 and 236 within a predetermined angle range. As described above, since the spinal fusion using the straight rod requires the surgical precision to form the hole for insertion of the screw into the pedicle after whether the installation positions of the screw are uniformly positioned needs to be accurately recognized, the burden on the surgeon increases.

In particular, in the polyaxial screw assemblies with the separated heads 212 and 232 disclosed in Patent Document 1 and 2, the rods 216 and 244 are commonly positioned to be too close to upper ends of rotation centers of the spherical motions of the socket groove portions 204 and 242 and the spherical bodies 214 and 238 coupled to the head parts 212 and 232, such that a sufficient space and flexibility cannot be provided. In addition, there is a problem in that a surgery time is increased because the straight rods each having a single shape need to be forcibly bent one by one to conform to a curved shape of the pedicle, a large amount of time is required for the rods to be uniformly connected to conform to the alignment line of the screw.

In addition, because most polyaxial screw assemblies proposed in the related art cannot connect segments of vertebral bodies by the segmental connection method, there is a problem in that the polyaxial screw assemblies cannot accommodate various rod lengths applicable to multiple segments instead of a single segment. Therefore, there is a need for a new improved pedicle screw assembly capable of overcoming the design limitation in the related art. Accordingly, it is necessary for a surgeon to pursue flexibility of the surgical procedure and a better prognosis for the patient's full rehabilitation using the pedicle screw assembly.

DOCUMENTS OF RELATED ART

Patent Documents

U.S. Pat. No. 7,862,594 B2 (registered on Jan. 4, 2011)
U.S. Patent Application Publication No. US 2004-0158247 A1 (published on Aug. 12, 2004)

SUMMARY OF THE INVENTION

The present invention has been made to solve the above-mentioned problems, and an object of the present invention is to provide a spinal implant having a detachable head module and an assembly thereof, which are suitable for semi-rigid fixation that may continuously connect pedicle screw by using a spring rod system that may be connected for each segment.

In addition, another object of the present invention is to provide a spinal implant having a detachable head module and an assembly thereof, in which an inner lock, which has a special structure, a rod, which may be connected for each segment, a head module, which is manufactured by assembling in advance a set screw outside, and a spherical body of an anchor, which is primarily inserted in advance into a human body, are secondarily and stably coupled to an accommodation portion of a housing, such that a fixing force may be maximized so that the spherical body of the anchor and the head module are not separated even after being coupled, and the spherical body of the anchor is not arbitrarily moved in the head module.

In addition, still another object of the present invention is to provide a spinal implant having a detachable head module and an assembly thereof, in which the head module is manufactured by being modularized in a state in which a direction and angle of a spring rod, which may be connected for each segment, is adjusted in vitro before a main operation, and the head module is connected to an anchor fixed to a vertebral body during the main operation, such that spinal implantation may be easily and conveniently performed without requiring a process of accurately aligning the rod in accordance with an alignment line of the anchor.

In addition, yet another object of the present invention is to provide a spinal implant having a detachable head module and an assembly thereof, in which a spring rod mounted on a head is configured on a head module by means of a single connection structure or a double connection structure, such that the head module may be continuously connected for each segment in accordance with an anchor array fixed to a segment of a vertebral body.

In addition, still yet another object of the present invention is to provide a spinal implant having a detachable head module and an assembly thereof, in which an anchor, which is separated from a head module, may be accurately fixed to a spine only by small skin incision before a main operation, and an upper end portion of the anchor may be exposed by a mid-line skin incision and coupled to the head module, such that the surgery time may be shortened, and the amount of bleeding may be minimized.

In addition, a further object of the present invention is to provide a spinal implant having a detachable head module and an assembly thereof, which are capable of minimizing an error of surgery by adjusting an insertion angle and depth of an anchor by inserting a guide wire through a hollow portion of the anchor.

In addition, another further object of the present invention is to provide a spinal implant having a detachable head module and an assembly thereof, in which an anchor is dualized into a section having a small screw thread pitch and a section having a large screw thread pitch, and the sections are coupled suitably for different types of bone density of a vertebral body, thereby to maximize bondability between a screw and a vertebra.

In order to achieve the above-mentioned objects, the present invention provides a spinal implant having a detachable head module, the spinal implant including: an anchor being configured to be percutaneously inserted into a vertebral body through skin including a body having a screw thread formed on an outer peripheral surface thereof, and a hollow hole penetrated through the body in an axial direction, and a spherical body positioned at an upper end of the body and having a fixing groove; a housing including an accommodation portion opened in a transverse direction and having a screw thread formed on an inner peripheral surface thereof, a plurality of grooves formed in a bottom surface of the accommodation portion, and a seating hole penetrated through a lower center of the housing; an inner lock fitted into the seating hole of the housing and having a spherical body hole sized to accommodate the spherical body; a rod seated in the grooves of the housing and configured to connect the anchors in a segmental connection method; and a set screw configured to fix the rod while being fastened to the accommodation portion of the housing, in which the head module is configured by assembling the set screw in a state in which the inner lock is seated in the seating hole of the housing and the rod is fixed to the grooves.

In this case, the rod may include: straight parts seated in the grooves of the housings; and a coil part wound to be inclined at a particular angle with respect to a center eccentrically spaced apart from a center of the straight part at a predetermined distance, and the rod may be fixed to the groove in a state in which a direction and gradient thereof are adjusted.

In the embodiment of the present invention, the spinal implant may further include: a single washer having an inverted U-shaped groove sized to accommodate a spherical surface of the rod and formed at one side of a bottom surface thereof, and a spherical protrusion sized to be accommodated in the U-shaped groove and formed at the other side of the bottom surface thereof, the single washer being placed on an upper portion of a groove of the accommodation portion. This corresponds to the head module to which only one rod is coupled.

As another example of the washer, the spinal implant may further include: a double washer having inverted U-shaped grooves sized to accommodate a spherical surface of the rod and formed in a bottom surface thereof while corresponding to the plural grooves of the housing, the double washer being placed on an upper portion of a groove of the accommodation portion. This corresponds to the head module to which two rods are coupled.

The present invention is characterized in that a gap is formed between the inner lock and a lower surface of the seating hole during a process of assembling the head module so that a shape of a lower rim of the inner lock is not deformed. This is to sufficiently secure a coupling space of the inner lock into which the spherical body is inserted during a process of secondarily assembling the spherical body of the anchor, which is primarily inserted into the human body in advance, to the head module.

In the embodiment of the present invention, cut-out grooves may be formed in an outer peripheral surface of the inner lock in a zigzag manner in an upward/downward direction so as to have an elastic force that widens or narrows the spherical body hole.

Another embodiment of the inner lock, the inner lock of the present invention may include: a cylindrical body tapered so as to be fitted into the seating hole of the housing; a concave surface formed in a central portion section of an outer peripheral surface of the cylindrical body and having a thickness smaller than a thickness of the cylindrical body to provide a sufficient elastic force; a cut-out groove formed at a predetermined angle in the cylindrical body; a bridge plate formed at a lower end of the cut-out groove and having a smaller thickness of the cylindrical body, the bridge plate being designed to withstand predetermined torque in a step of coupling the head module and to fracture when torque equal to or higher than predetermined torque is applied to the set screw during a process of secondarily assembling the anchor, which has been primarily inserted, to the spherical body; and a rim formed on a lower-end surface of the cylindrical body so as to be concave inward in order to increase a fixing force to prevent the spherical body of the anchor from being withdrawn.

In addition, an internal thread groove may be formed in an inner peripheral surface of the spherical body hole of the inner lock, and an external thread may be formed on an outer peripheral surface of the spherical body, such that a coupling frictional force is maximized when the spherical body is fitted into the spherical body hole.

The anchor may have a dualized screw thread structure in which a pitch of an upper section screw thread is small and a pitch of a lower section screw thread is large so that bondability with the vertebral body is maximized. That is, a portion of an upper section, which has a small screw thread pitch, is coupled to a cortical bone of the vertebral body having high bone density, and a portion of a lower section, which has a large screw thread pitch, is coupled to a cancellous bone having low bone density. In this case, a self-tapper groove may be formed in the screw thread of the anchor and serve as a passageway through which bone remnants are smoothly discharged when the anchor is inserted into a bone while rotating.

In the head module of the present invention, the straight parts at two opposite sides of the rod may be manufactured to the shape having a flat upper portion to set a reference fixing position at which the rod is fixed to the groove. In particular, when the rod is fixed in a state in which the flat surface of the rod is directed upward, the coil part may automatically stand with a gradient of about $31.7°±5°$ with respect to a centerline of the straight part, and the coil parts of the two opposite left and right sides rods may be symmetrically fixed at two opposite sides based on a centerline of a human body.

In another embodiment of the rod according to the present invention, a cross-sectional diameter of a section of the straight part of the rod may be larger than a cross-sectional diameter of a section of the coil part.

A second embodiment of the present invention provides an assembly of a spinal implant having a detachable head module, the assembly including: first to third anchor arrays including groups of anchors each including a body having a screw thread formed on an outer peripheral surface thereof, and a hollow hole penetrated through the body in an axial direction, and a spherical body positioned at an upper end of the body and having a fixing groove, the anchors being configured to be percutaneously inserted into segments of a vertebral body through skin; housings each including an accommodation portion opened in a transverse direction and having a screw thread formed on an inner peripheral surface thereof, a plurality of grooves formed in a bottom surface of the accommodation portion, and a seating hole penetrated through a lower center of the housing; inner locks each fitted into the seating hole of the housing and having a spherical body hole sized to accommodate the spherical body; rods each having a straight part seated in the groove of the housing, and a coil part wound to be inclined at a particular angle with respect to a center eccentrically spaced apart from a center of the straight part at a predetermined distance, the rods being configured to connect the anchors in a segmental connection method; and first and second detachable head module arrays fitted with the spherical bodies of the anchors of the first to third anchor arrays by grouping the head modules including set screws for fixing the rods while being fastened to the accommodation portions of the housings.

In the second embodiment of the present invention, the head module may be a single rod head module modularized by seating the straight part of the rod in one of two U-shaped grooves of the housing, fixing the rod with a predetermined direction and angle of the coil part of the rod, and then pressing and fixing the rod while fastening the set screw to the accommodation portion, and the head module may have a segmental connection structure in which the head modules are coupled to the anchors of the first and third anchor arrays, the housing without the rod is fitted with the anchor of the second anchor array, and the rod of the single rod head module is seated in the housing and then fixed by the set screw.

In a modified example of the second embodiment, the head module may be a double rod head module modularized by seating the straight parts of the two rods in opposite directions in two U-shaped grooves of the single housing, fixing the rods with predetermined directions and angles of the coil parts of the rods, and then pressing and fixing the rods while fastening the set screw to the accommodation portion, and the head module may have a segmental connection structure in which the housings in which the rod is not seated at two opposite sides of the double rod head module, are fitted with the first and third anchor arrays, and the rod of the double rod head module is seated in one of the two U-shaped grooves of the accommodation portion and fixed by the set screw.

In the second embodiment of the present invention, the coil parts of the rods of the first and second head module arrays coupled to the anchors of the first to third anchor arrays may be symmetrically positioned at two opposite sides of a spine based on a centerline of a human body.

According to the present invention described above, the following effects are achieved.

First, the head module is made in vitro before a surgical operation by seating the inner lock in the seating hole of the housing, fixing the spring rod, which may be connected for each segment, to the housing in the state in which the direction and the angle of the spring rod is adjusted, and assembling the set screw, and the head module is configured separately from the anchor inserted into the vertebral body, such that the head module may be suitably applied to the semi-rigid fixation using the single segment spring rod system or a multi-segment spring rod system. In particular, in the related art, an angle and direction of a spring rod are adjusted in a patient's body. In contrast, the head module in the present invention may be completely set in vitro and then inserted, which makes it possible to quickly perform a surgical operation.

Second, the inner lock includes the cylindrical body having the concave surface of the small thickness with the elasticity, the thin bridge plate formed at the lower end of the cut-out groove and formed at the predetermined angle on the cylindrical body, and the rim formed on the lower-end surface of the cylindrical body so as to be concave inward, and the inner lock is mounted in the accommodation portion of the housing. Due to this structure, the head module, which is assembled in advance outside, and the anchor, which is primarily inserted in advance into the human body, are stably coupled, such that the fixing force may be maximized so that the spherical body of the anchor and the head module are not separated even after being coupled, and the spherical body of the anchor is not arbitrarily moved in the head module.

Third, the spring angle and direction of the rod, which may be connected for each segment, is adjusted and set in advance in vitro by means of the head module, and the natural segmental alignment is enabled, such that a separate process of setting a rod fixing position and aligning the rod is not required during the main operation. Therefore, the spinal implant surgery may be conveniently and simply performed, which significantly reduces the surgery time.

Fourth, before the main operation, the small skin incision may be performed, and then only the anchor may be accurately fixed to the vertebral body. In addition, during the main operation, the mid-line skin incision is performed, the upper portion of the fixed anchor is exposed after slight muscle dissection in a transverse direction of the spine, and then the head module is coupled. This surgical process may not only shorten the surgery time, but also reduce damage to muscles by using minimum skin ligation and reduce the amount of bleeding to a minimum level.

Fifth, the upper section of the anchor has a small screw thread pitch and is coupled to the cortical bone of the vertebral body having high bone density, and the lower section has a large screw thread pitch and is coupled to the cancellous bone of the vertebral body having low bone density, such that the dualized screw thread structure of the anchor may maximize the bondability with the vertebral body.

Sixth, the hollow portion is penetrated through the anchor in the axial direction, and the guide wire penetrates along the hollow portion, such that the insertion angle and depth of the anchor may be adjusted by using the guide wire inserted into the vertebral body before the main operation. Therefore, it is possible to minimize an error in the insertion direction and insertion depth of the anchor.

Seventh, the hexagonal lobe wrench groove is formed in the spherical body of the anchor and maximizes the ease of coupling with the surgical instrument, such that the anchor may be more securely inserted into the vertebral body by a coupling rotational force.

Eighth, the self-tapper groove is separately formed in the dualized screw thread of the anchor, such that the cut bone may be smoothly discharged when the anchor is inserted into the bone while cutting the vertebra.

DETAILED DESCRIPTION

Hereinafter, exemplary embodiments of the present invention will be described in detail with reference to FIGS. 4 to 19 attached thereto.

A spinal implant having a detachable head module and an assembly thereof according to the present invention are implemented to shorten a surgery time and conveniently perform a surgical procedure by accurately fixing an anchor to a vertebral body before a main operation and coupling a head module, to which a rod is coupled, to the anchor during the main operation.

The present invention relates to an assembly suitable for a spring rod system which may be connected for each segment that has been developed by the applicant of the present application and a detailed configuration thereof will be described with reference to FIGS. 4 to 10.

Figure 1:
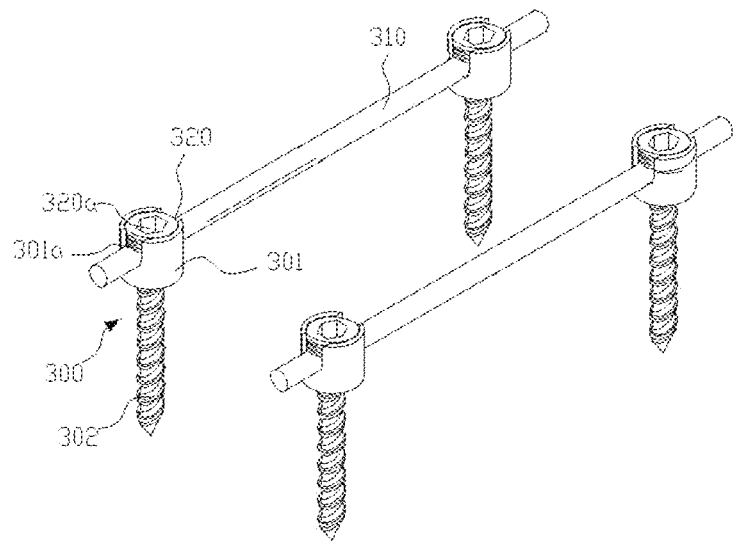
FIG. 1 is a perspective view illustrating a configuration of a spinal fixation apparatus in the related art.
Figure 2:
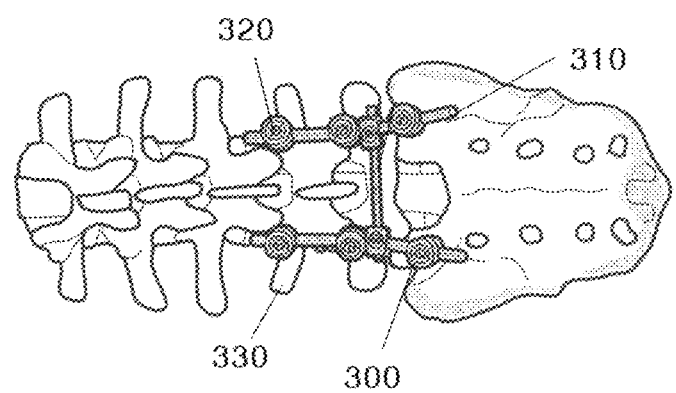
FIG. 2 is a schematic view illustrating a state in which the spinal fixation apparatus in the related art is mounted on a vertebral segment.
Figure 3A:
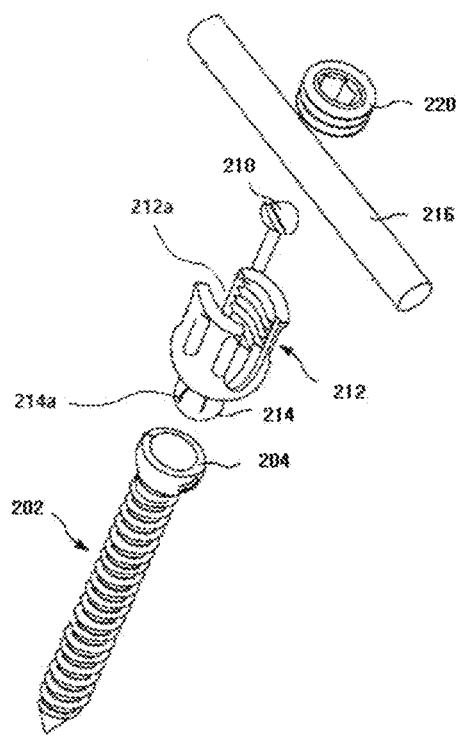
FIGS. 3A and 3B are exemplified views illustrating a configuration of a polyaxial pedicle assembly in the related art.
Figure 3B:
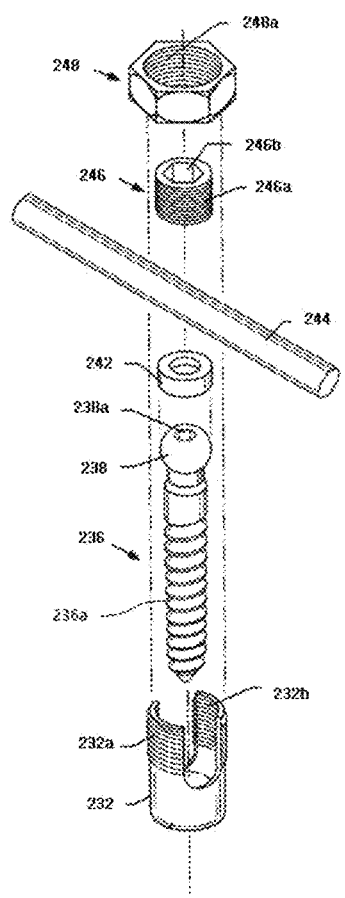
Figure 4:
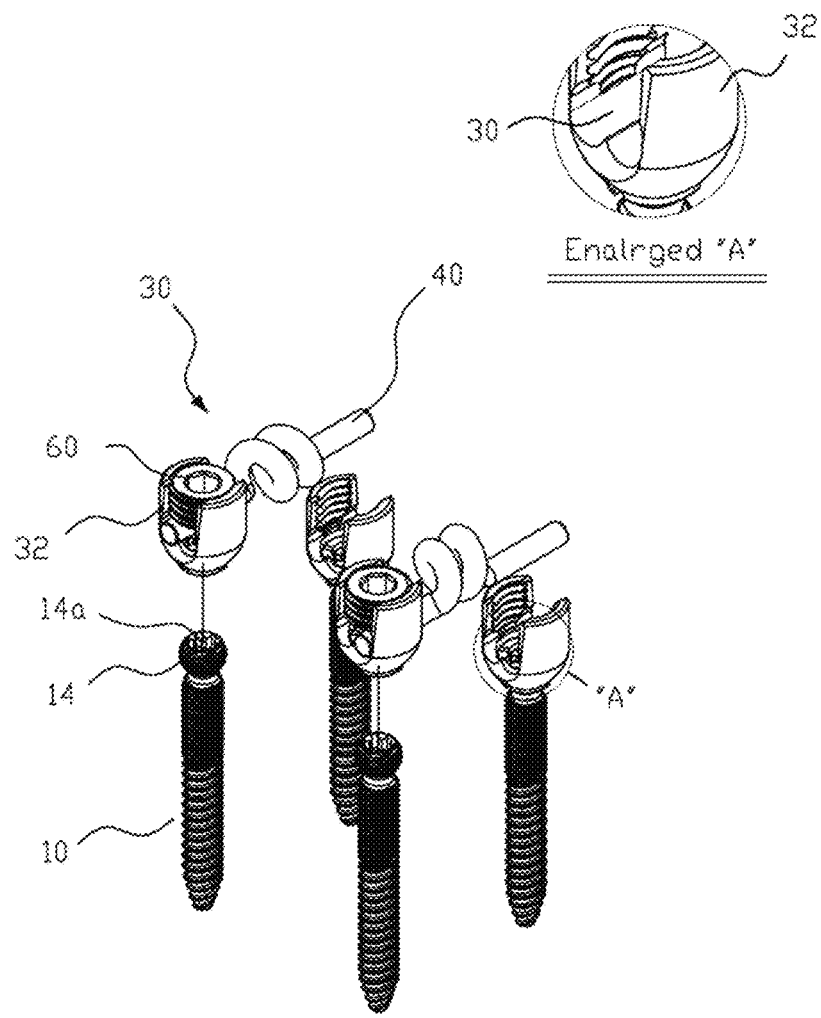
FIG. 4 is an exploded perspective view illustrating a configuration of an embodiment of a spinal implant assembly having a detachable head module according to the present invention.
Figure 5:
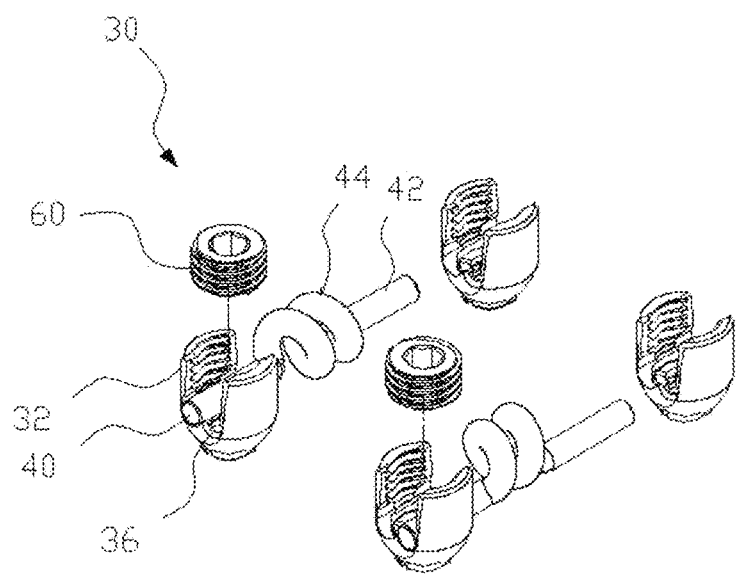
FIG. 5 is an exploded perspective view illustrating a configuration of the detachable head module that is a main part of the spinal implant assembly according to the present invention.
Figure 6:
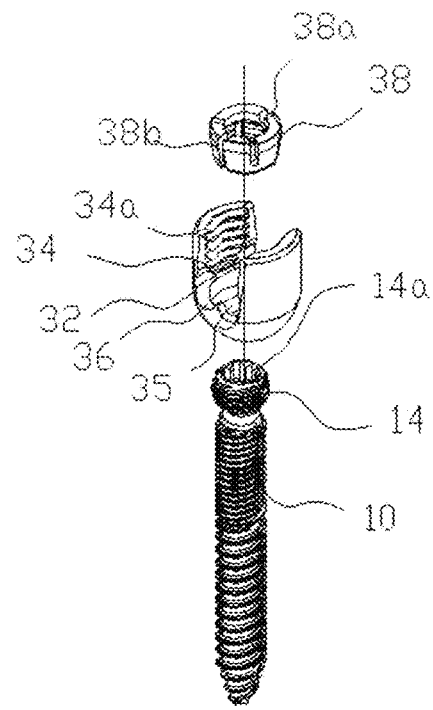
FIG. 6 is an exploded perspective view illustrate a state in which an anchor and a housing, which are main parts of the present invention, are coupled.
Figure 7:
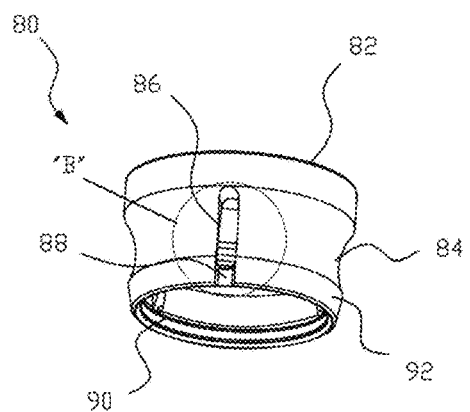
FIG. 7 is a perspective view illustrating a configuration of an inner lock that is a main part of the present invention.
Figure 7:
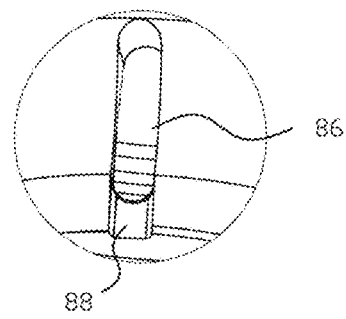
Figure 8:
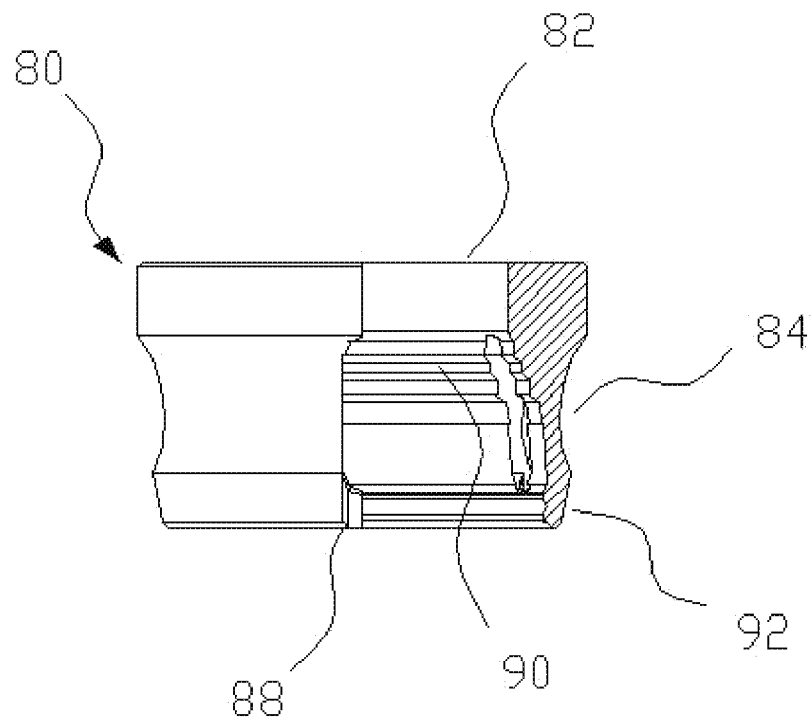
FIG. 8 is a cross-sectional view of FIG. 7.
Figure 9:
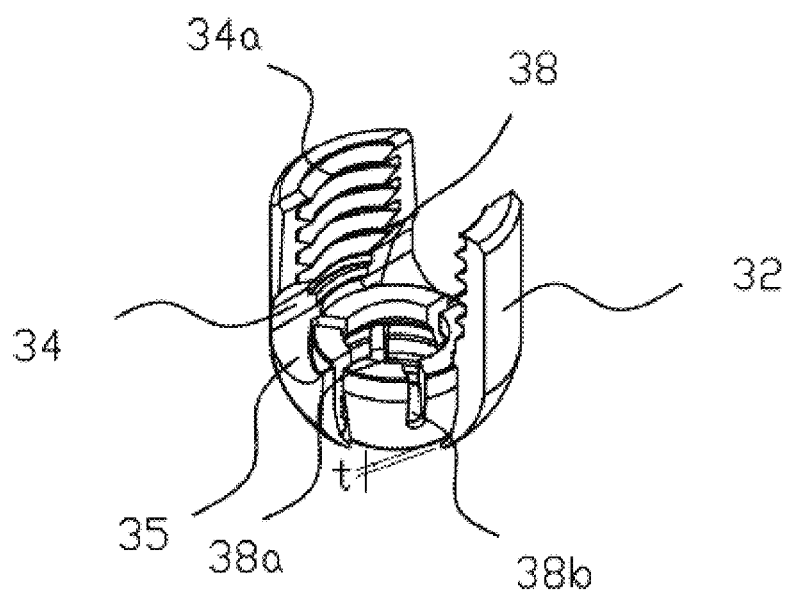
FIG. 9 is a perspective view illustrating a state in which the housing and the inner lock are coupled.
Figure 10:
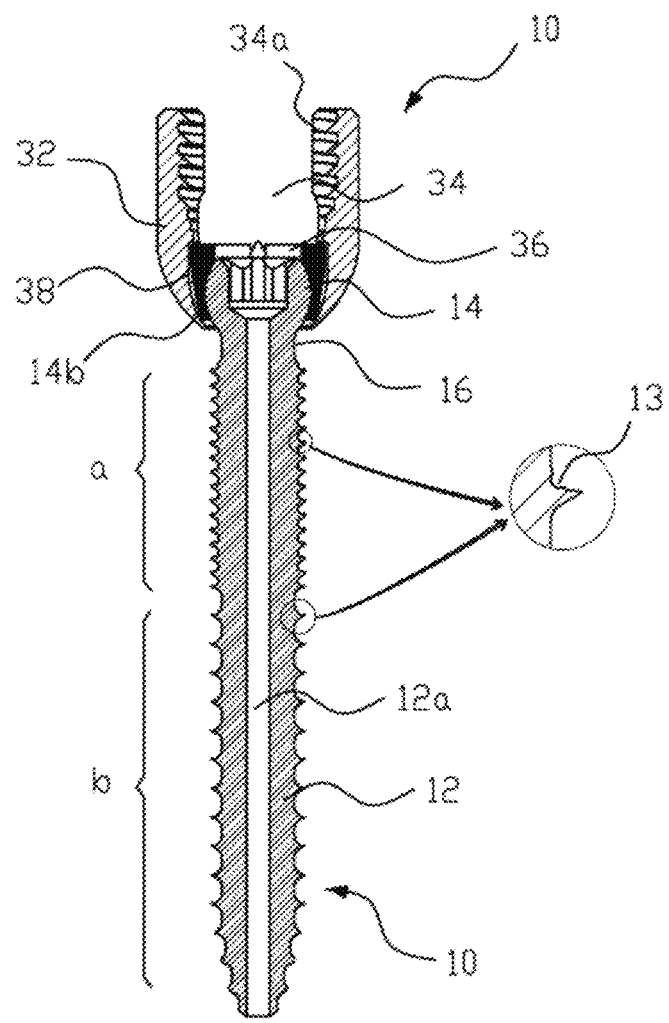
FIG. 10 is a coupled cross-sectional view of FIG. 6.

FIG. 4 is an exploded perspective view illustrating a configuration of an embodiment of a spinal implant assembly having a detachable head module according to the present invention, FIG. 5 is an exploded perspective view illustrating a configuration of the detachable head module that is a main part of the spinal implant assembly according to the present invention, FIG. 6 is an exploded perspective view illustrate a state in which an anchor and a housing, which are main parts of the present invention, are coupled, FIG. 7 is a perspective view illustrating a configuration of an inner lock that is a main part of the present invention, FIG. 8 is a cross-sectional view of FIG. 7, FIG. 9 is a perspective view illustrating a state in which the housing and the inner lock are coupled, and FIG. 10 is a coupled cross-sectional view of FIG. 6.

As illustrated in the drawings, the spinal implant of the present embodiment broadly includes anchors 10 configured to be percutaneously inserted into a pedicle and a vertebral body through skin, and a detachable head module 30 configured to connect the anchors 10 and fix a spine.

With reference to a detailed configuration, as illustrated in FIGS. 4 and 10, the anchor 10 includes: a body 12 having a screw thread formed on an outer peripheral surface thereof and a hollow hole 12a penetrated through the body 12 in an axial direction; a spherical body 14 positioned at an upper end of the body 12 and having a fixing groove 14a; and a neck portion 16 configured to connect the body 12 and the spherical body 14. Here, the fixing groove 14a is formed as a wrench groove.

In this case, the body 12 of the anchor has a dualized screw thread structure in which a pitch of an upper section screw thread a is small and a pitch of a lower section screw thread b is large in order to maximize bondability with a bone. In general, the portions of the spine into which the anchor 10 is inserted are the pedicle and the vertebral body. The vertebral body is further classified into a cortical bone and a cancellous bone. Among the bones, because the pedicle and the cortical bone of the vertebral body have high bone density, the upper section screw thread a with a small pitch is coupled to the pedicle and the cortical bone of the vertebral body. Because the cancellous bone of the vertebral body has low bone density, the lower section screw thread b with a large pitch is coupled to the cancellous bone of the vertebral body. Therefore, the bondability between the anchor 10 and a vertebral body 204 is maximized.

In the present embodiment, a self-tapper groove 13 is separately formed on the screw thread b of the body 12 and serves as a passageway through which bone remnants are smoothly discharged when the anchor 10 is inserted into the bone while rotating.

In addition, an external thread 14b is also formed on an outer peripheral surface of the spherical body 14 to maximize a coupling frictional force with an internal thread groove formed in an inner surface of an inner lock to be described below.

The wrench groove 14a of the spherical body 14 is provided in the form of a hexagonal lobe to maximize bondability and coupling rotational force with a surgical instrument. The bondability between the surgical instrument and the anchor increases because the hexagonal wrench groove 14a is coupled to the surgical instrument only when the wrench groove 14a accurately coincides with the tip end of the surgical instrument. In addition, the hexagonal groove exerts a higher coupling rotational force than a cross-shaped groove.

In the configuration of the anchor 10, the hollow hole 12a of the body 12 is a passageway for a guide wire 202. That is, the pedicle and the vertebral body 204 are pierced in advance along a predetermined route, the guide wire 202 is inserted into the pierced portion, and then the guide wire 202 passes through the hollow hole 12a of the body 12, such that an angle and depth by which the anchor is inserted into the pedicle and the vertebral body 204 may be identified based on the guide wire 202. Therefore, it is possible to minimize a likelihood of an error of an insertion direction or an insertion depth of the anchor.

Figure 17:
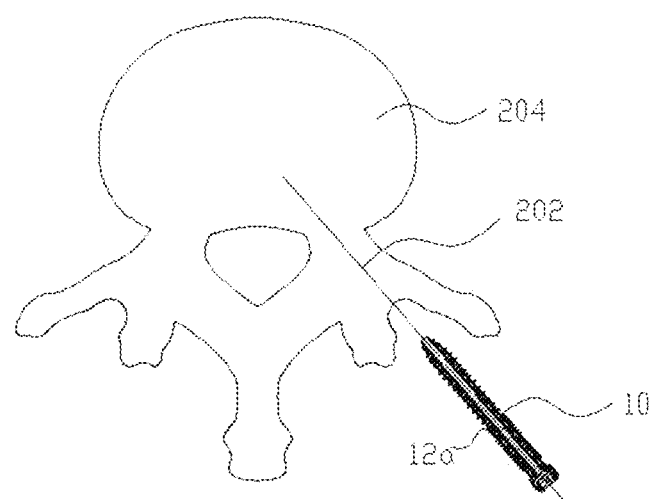
FIG. 17 is a view illustrating a state in which a guide wire is inserted before the anchor according to the present invention is inserted into a vertebral body.
Figure 18:
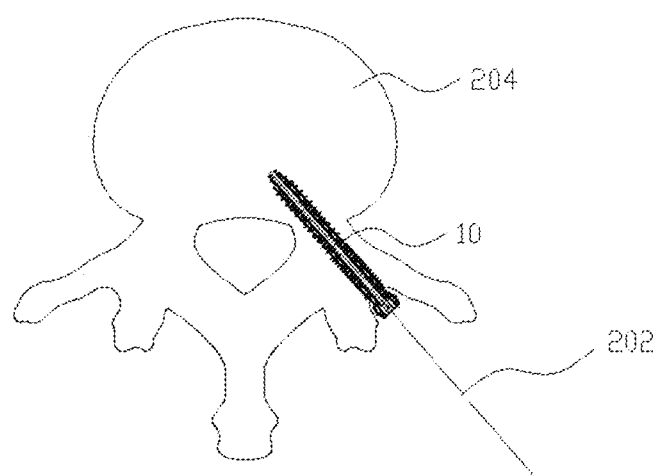
FIG. 18 is a view illustrating a state in which the anchor is inserted into the vertebral body in a correct direction along the guide wire.
Figure 19:
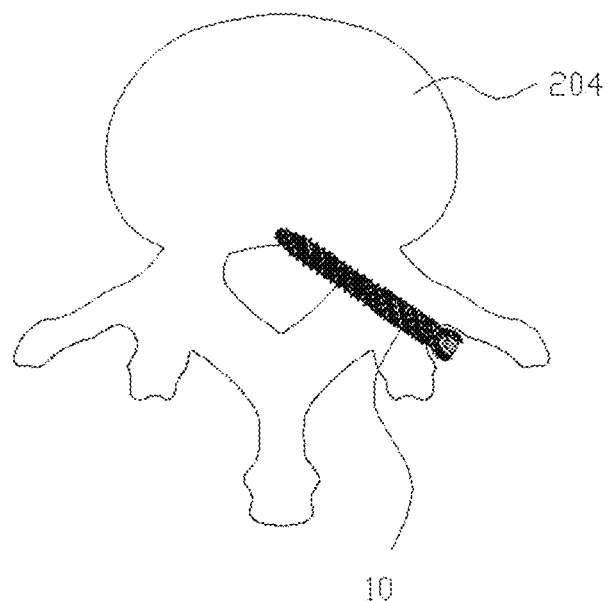
FIG. 19 is a view illustrating a state in which the anchor is inserted into the vertebral body in an incorrect direction without the guide wire.

More specifically, as illustrated in FIGS. 17 and 18, the guide wire is inserted into the vertebral body 204 at a predetermined insertion angle and by a predetermined depth (illustrated in FIG. 17), and then the guide wire 202 penetrates along the hollow hole 12a of the anchor 10, such that the insertion angle of the anchor 10 is determined to be equal to the predetermined insertion angle. Thereafter, when the anchor 10 is inserted into the vertebral body 204 by the depth by which the wire is inserted, the anchor 10 is accurately inserted into the vertebral body by the predetermined angle and depth (illustrated in FIG. 18). FIG. 19 is a view illustrating a state in which the anchor 10 is inserted into the vertebral body 204 in an incorrect direction and at an incorrect angle without the guide wire 202.

As illustrated in FIGS. 5 to 6, the head module 30 includes: a housing 32 having an accommodation portion 34 opened in a transverse direction and having a screw thread 34a formed on an inner peripheral surface thereof, a plurality of U-shaped grooves 36 formed in a bottom surface of the accommodation portion 34, and a seating hole 35 penetrated through a lower center of the housing; an inner lock 38 fitted with the seating hole 35 of the housing 32 and having a spherical body hole 38a sized to accommodate the spherical body 14; a rod 40 seated in the U-shaped grooves 36 of the housing 32 and configured to maintain a spine fixing state while connecting the anchors inserted into the spine; and a set screw 60 configured to fix the rod 40 by being fastened to the accommodation portion 34 of the housing 32.

In this case, the inner lock 38 has cut-out grooves 38b formed in an outer peripheral surface thereof in a zigzag manner in an upward/downward direction so that the inner lock 38 has an elastic force that widens or narrows the spherical body hole 38a. Furthermore, when the inner lock 38 is inserted into the seating hole 35, a certain gap t is formed between the outer lower surface of the inner lock 38 and the inner bottom surface of the seating hole 35 of the housing 32 so that the lower shape of the inner lock 38 is not deformed (see FIG. 9).

The gap t is provided to ensure clearance in the mating space of the sphere hole 38a, thereby allowing the sphere 14 to be smoothly inserted into the sphere hole 38a of the inner lock 38. This gap also serves to expand the engagement space within the seating hole 35 that accommodates the sphere hole 38a. Specifically, when the lower surface of the inner lock 38 comes into contact with the bottom surface of the seating hole 35 during assembly of the head module 30, if the mating clearance space lacks in the sphere hole 38a when receiving the sphere 14, it makes insertion difficult. Consequently, when pressing the sphere 14 into the sphere hole 38a, the insertion force applied to the inner lock 38 may hinder insertion, and could lead to deformation-such as the lower surface of the inner lock 38 being crushed by the sphere 14.

According to the above-mentioned structure, when the spherical body 14 is fitted into the spherical body hole 38a, the spherical body hole 38a is widened by the cut-out grooves 38b, such that the spherical body 14 is smoothly fitted. The spherical body hole 38a is narrowed after the spherical body 14 is accommodated in the spherical body hole 38a. In this state, the neck portion 16 of the anchor 10 is caught by a stepped portion (not illustrated) formed on a bottom of the seating hole 35 of the housing 32, such that the anchor 10 is not withdrawn.

An operational principle of the inner lock 38 having the above-mentioned structure will be described below.

In order to implement the head module 30 outside, the rod 40 is seated in the grooves 36 of the housing 32, and then torque is applied to the set screw 60 to fix the rod so that the rod is not withdrawn or moved. In this case, the inner lock 38 provided in the seating hole 35 of the housing 32 is pressed in the application direction of the torque of the set screw 60, such that the inner lock 38 is narrowed along an inner surface of the seating hole 35 of the housing 32, and an inner diameter of the inner lock 38 is partially decreased. In this state, the inner diameter of the inner lock 38 is temporarily increased when the spherical body 14 is fitted with the inner lock 38 of the head module 30. Thereafter, when the set screw 60 is fully tightened, the inner lock 38 is further narrowed and fixes the spherical body 14 while surrounding the spherical body 14.

Before the inner lock 38, which operates as described above, is coupled to the spherical body 14 of the anchor 10, the inner lock 80 is coupled to the seating hole 35 of the housing 32 in order to define a shape of the head module 30. In this state, when the set screw 60 is tightened in the state in which the rod 40 is seated in the accommodation portion 34 of the housing 32, a space (hole), which corresponds to the inner diameter of the inner lock 80 to which the spherical body 14 needs to be coupled while passing through the inner lock 80, is decreased. For this reason, there is a likelihood of the occurrence of a problem that the inner lock 80 is not coupled to the spherical body 14. In order to prevent the problem, the present invention provides another embodiment of the inner lock 80, as illustrated in FIGS. 7 and 8.

As illustrated in the drawings, the inner lock 80 has a cylindrical body 82 tapered so as to be fitted into the seating hole 35 of the housing 32, and a central portion section of the cylindrical body 82 has a concave surface 84 having an elastic force, thereby providing an elastic force that allows the inner lock 80 to be sufficiently widened or narrowed when the inner lock 80 is coupled to the spherical body 14. That is, a thickness of the concave surface 84 is smaller than a thickness of the cylindrical body 82. Therefore, at the moment when the spherical body 14 of the anchor 10 is fitted with the cylindrical body 82, the cylindrical body 82 is widened and then narrowed back to an original position by elasticity of the concave surface 84, such that the cylindrical body 82 is restored to surround the spherical body 14.

A cut-out groove 86 is formed in an outer peripheral surface of the cylindrical body 82 in a vertical direction, and a bridge plate 88, which has a smaller thickness than the cylindrical body 82, is integrally provided on a bottom surface of the cut-out groove 86. During a process of assembling the head module 30 in which the inner lock 80 is coupled to the seating hole 35 of the housing 32, the bridge plate 88 is designed to maintain a shape of the inner lock 80 while withstanding torque with a predetermined value (at most 1 to 1.3 N in the present embodiment) when the set screw 60 is tightened after the rod 40 is seated in the accommodation portion 34 of the housing 32. During a secondary process of assembling the head module 30 and the spherical body 14 of the anchor 10 inserted primarily in advance, the bridge plate 88 fractures only when torque, which is equal to or higher than predetermined torque, is applied through the set screw. That is, the design is implemented such that during the process of strongly tightening the set screw 60 after the head module 30 is fitted with the spherical body 14 of the anchor 10, the bridge plate 88 fractures, and the seating hole 35 of the housing 32 is temporarily expanded, such that the seating hole 35 is coupled to the spherical body 14. Internal thread grooves 90 are formed in upper and lower portions of an inner peripheral surface of the cylindrical body 82 and coupled to the external thread 14b of the spherical body 14, thereby providing a secure coupling frictional force.

In addition, a rim 92, which is concave inward, is formed at a lower end of the cylindrical body 82 and supplements a coupling force while surrounding the neck portion of the bottom surface of the spherical body 14.

An operating process in which the inner lock 80 configured as described above is fitted with the spherical body 14 will be more specifically described below.

In the present embodiment, the inner lock 80 is fixed as the inner diameter of the cylindrical body 82 is slightly increased and then decreased again when the spherical body 14 of the anchor 10 is inserted into and passes through the space corresponding to the inner diameter of the cylindrical body 82. That is, the cylindrical body 82 is positioned to protrude slightly upward without being fully fitted into the seating hole 35 of the housing 32 when the head module 30 is implemented. This position corresponds to a point with which the rod 40 initially comes into contact when the rod 40 is tightened by the set screw 60. With the abovementioned configuration, the space, in which the spherical body 14 may be coupled, may be secured in the housing 32. That is, the cylindrical body 82 of the inner lock 80 is slightly lifted without being fully fitted into the seating hole 35 when the rod 40 is slightly fixed by the set screw 60 during the process of assembling the head module 30, such that the deformation of the inner lock 80 is minimized. In this case, a time point at which the inner lock 80 is deformed is controlled on the basis of a magnitude of torque applied to the set screw 60. That is, the bridge plate 88 serves to prevent the deformation while maintaining an overall cylindrical shape of the inner lock 80 without being destroyed (damaged) until torque reaches predetermined level (at most 1 to 1.3 N). Further, when the set screw 60 is slightly tightened with torque of 1.3 N or less in a step of assembling the head module 30, the shape of the head module 30 is maintained in a state in which the rod 40 is not withdrawn from the housing 32.

In other words, during the assembly of the inner lock, torque applied to the setscrew 60 causes the inner lock to be pressed downward. In the absence of torque, the bridge plate 88 maintains the shape of the rim 92 of the inner lock within the mounting hole 35 of the housing 32. When torque of 1.3 N or greater is applied to the setscrew, the inner lock is pushed downward, causing the rim 92 to expand. As a result, the bridge plate 88, which connects the incision grooves 86, breaks, allowing the rim 92 of the inner lock to settle in place and secure the sphere 14.

In particular, the shape of the inner lock 80 in the seating hole 35 of the housing 32 is maintained without being deformed, which secures the space in which the head module 30 and the spherical body 14 of the anchor 10, which is primarily inserted into the human body in advance, may be smoothly secondarily coupled and aligned. Even though the space of the inner hole of the inner lock 80 is partially narrow during the process of secondarily coupling the head module 30 to the anchor 10 primarily inserted into the human body, the spherical body 14 may be relatively more easily inserted into the internal space of the inner lock 80 by elasticity of the concave surface 84. By virtue of the increased elasticity of the concave surface 84, it is possible to disperse torque while preventing, to some extent, the torque, which is applied to the inner lock 80 and the inside of the housing 32 during the coupling process, from being concentrated at a particular point.

After the spherical body 14 is coupled into the inner lock 80 of the head module 30, the set screw 60 is strongly tightened by using an anti-torque driver and a final driver (not illustrated) with a higher torque (about 12 N or more). In this process, the bridge plate 88 is fractured, and the cylindrical body 82 of the inner lock 80 is deformed, such that the cylindrical body 82 of the inner lock 80 is securely coupled to the spherical body 14 by providing tension while surrounding the surface of the spherical body 14. In this case, when the set screw 60 is coupled by high torque (currently, higher than about 2 N) during the process of assembling the head module 30 to the anchor 10, the bridge plate 88 is fractured, and the inner lock 80 is fully shrunk. Therefore, in the future, the head module 30 cannot be recoupled to the anchor 10 inserted into the human body.

The rod 40 includes straight parts 42 each seated in the grooves 36 of the housing 30, and a coil part 44 wound to be inclined at a particular angle with respect to a center eccentrically spaced apart from a center of the straight part 42 at a predetermined distance. In the present embodiment, the coil part 44 of the rod 40 has a shape wound twice.

Figure 13:
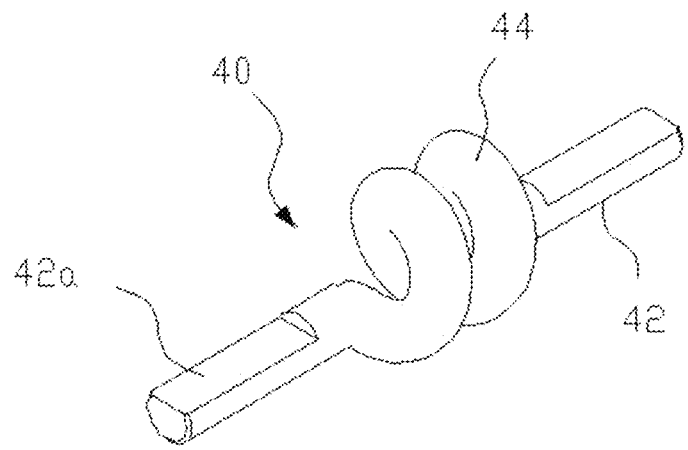
FIG. 13 is a perspective view illustrating another embodiment of a spring rod in the present invention.
Figure 14:
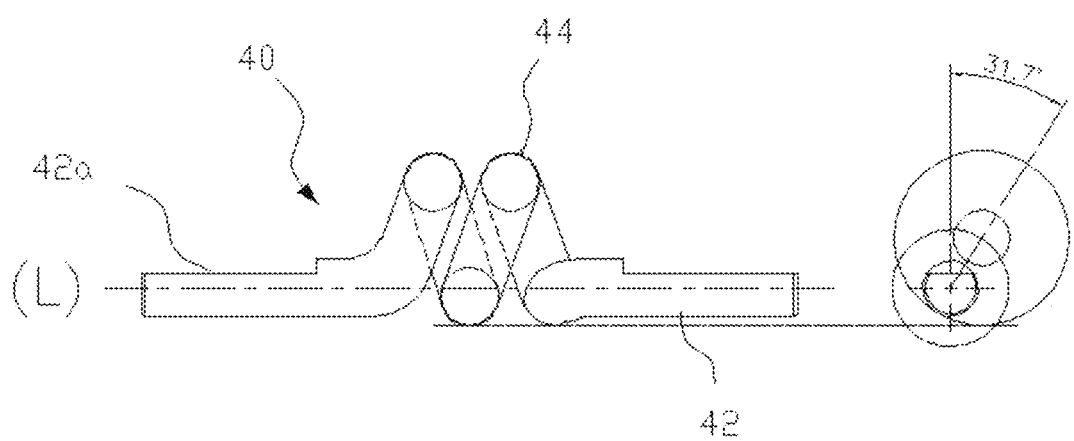
FIG. 14 is a cross-sectional view of FIG. 13.

FIGS. 13 and 14 illustrate another embodiment of the rod 40.

In the embodiment of the present invention, as illustrated in FIG. 13, the straight parts 42 at two opposite sides of the rod 40 may each have a flat surface 42a having a flat upper portion to set a reference fixing position for the rod 40. When the rod 40 is fixed in a state in which the flat surface 42a is directed upward, the coil part 44 automatically stands with a gradient of about $31.7°±5°$ with respect to a centerline of the straight part 42. The coil parts 44 of the two opposite left and right rods 40 are symmetrically fixed at two opposite sides based on a centerline of the human body.

In addition, as illustrated in FIG. 14, a cross-sectional diameter of a section of the straight part 42 of the rod 40 may be larger than a cross-sectional diameter of a section of the coil part 44. This is to maximally maintain the rigidity within a range in which the process of fixing the rod 40 is allowable in order to delay time of occurrence of a fatigue fracture of the straight part 42 or semi-permanently maintain the straight part 42 when examined clinically long-term after lumbar fixation surgery.

The rod 40 having the above-mentioned structure may prevent the spine from being deflected toward one side and restrict the extension of the waist when the spine is leaned backward more than the flexion motion when the waist is bent forward. Therefore, a biomechanical structure, which is similar to a normal load distribution structure, is also provided to a plurality of fused spinal segments and the portions between the segments, thereby implementing an effect of reducing the strain on the waist.

In the detachable head module 30 having the above-mentioned configuration, in case that the rod 40 is seated in one of the two U-shaped grooves 36 of the housing 32, the other groove 36' remains as an empty space, and a load may not be uniformly distributed at the time of pressing and fixing the set screw 60. In order to prevent the problem, in the present invention, a single rod washer 46 and a double rod washer 48 may be additionally provided, as illustrated in FIGS. 15 and 16.

Figure 15:
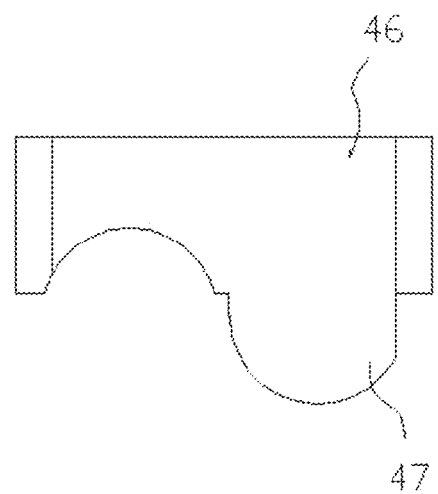
FIG. 15 is a cross-sectional view illustrating a configuration of a single rod washer added to the detachable head module in the present invention.
Figure 16:
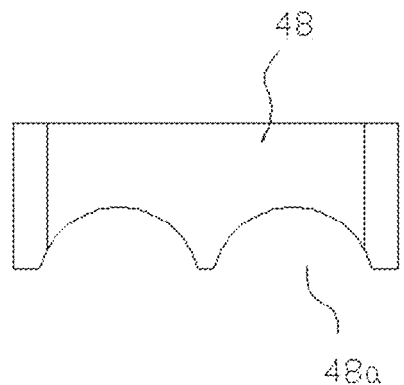
FIG. 16 is a cross-sectional view illustrating a configuration of a double rod washer added to the detachable head module in the present invention.

FIG. 15 is a configuration view of the single rod washer, and FIG. 16 illustrates a configuration of the double rod washer.

The single rod washer 46 illustrated in FIG. 15 has a structure in which an inverted U-shaped groove 46a sized to accommodate a spherical surface of the rod 40 is formed at one side of a bottom surface thereof, and a spherical protrusion 47 sized to be accommodated in the U-shaped groove 36' is formed at the other side of the bottom surface thereof.

The double rod washer 48 illustrated in FIG. 16 has a structure having double inverted U-shaped grooves 48a capable of accommodating the spherical surfaces of the two rods 40 seated in the U-shaped grooves 36 and 36' when the rods are continuously connected.

Figure 11:
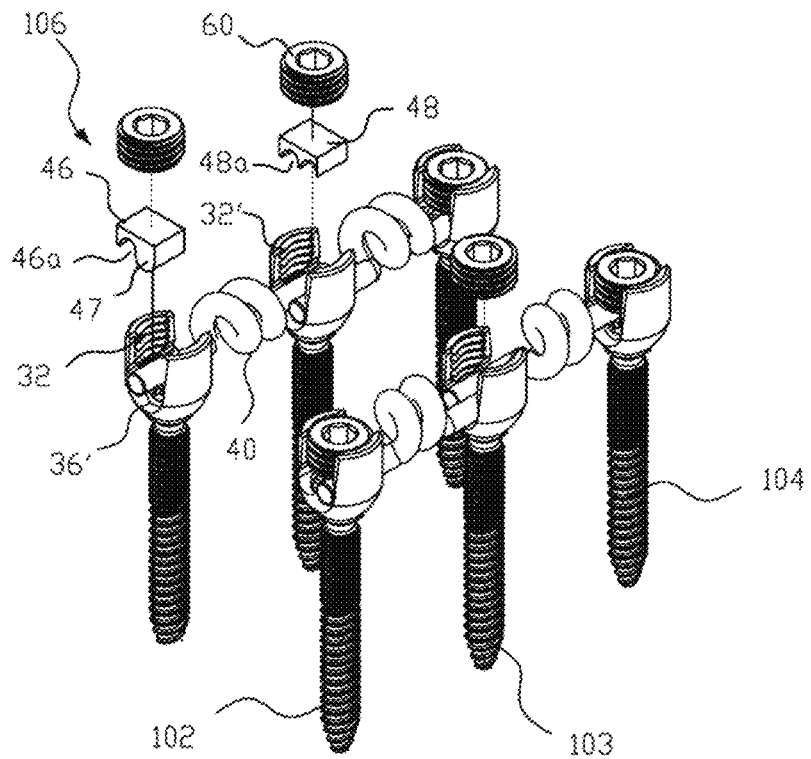
FIG. 11 is a coupled perspective view of the spinal implant assembly having the detachable head module according to the present invention, i.e., a coupled perspective view of a single rod head module.
Figure 12:
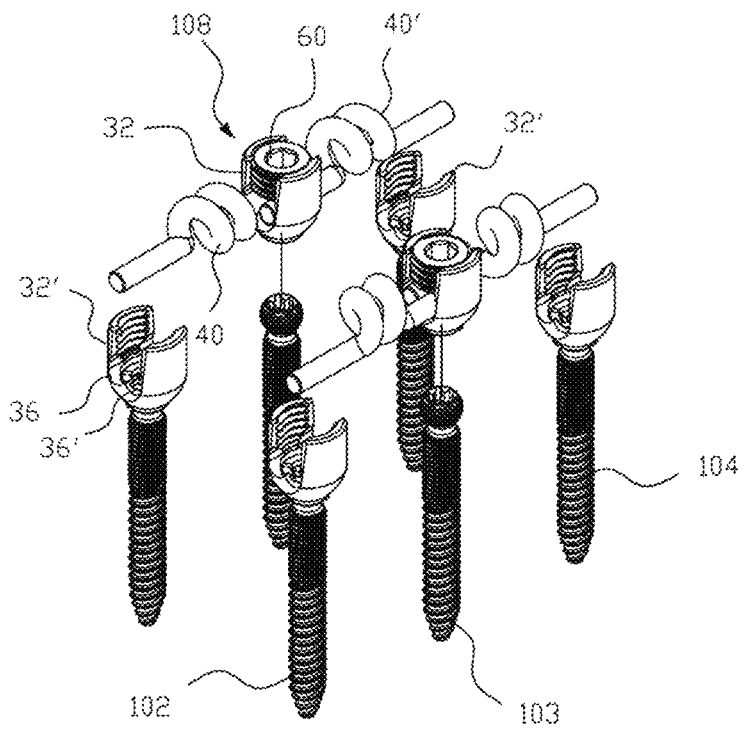
FIG. 12 is a coupled perspective view of the spinal implant assembly having the detachable head module according to the present invention, i.e., a coupled perspective view of a double rod head module.

The spinal implant assembly having the detachable head module having the above-mentioned structure fixes the spine with a segmental connection structure. That is, in the present invention, the anchors 10 are respectively inserted into the spinal segments and constitute first to third anchor arrays 102, 103, and 104. Single rod head modules 106 and double rod head modules 108 may be mounted on the first to third anchor arrays 102, 103, and 104. FIG. 11 illustrates an example in which the single rod head modules 106 are coupled to the first to third anchor arrays 102, 103, and 104 defined by binding the three anchors 10. FIG. 12 illustrates an example in which the double rod head modules 108 are coupled to the first to third anchor arrays 102, 103, and 104 defined by binding the three anchors 10.

The single rod head module 106 illustrated in FIG. 11 is modularized by seating the rod 40 in one of the two U-shaped grooves 36 of the housing 30, fixing the rod 40 with a predetermined direction and angle of the coil part 44 of the rod 40, and then pressing and fixing the rod 40 while fastening the set screw 60 to the accommodation portion 32. The single rod head module 106, which is assembled as described above, naturally fixes the spine in accordance with the shape of the spine as the spherical body 14 of the anchor 10 is fitted into the spherical body hole 38a of the inner lock 38. The housing 30', in which the rod 40 is not seated, is fitted with the second anchor array 103 at the center. This state is a segmental connection method in which the rods of the single rod head modules 106 are seated in and connected to the two U-shaped grooves 36 of the housings 30.

The method of connecting the single rod head module to the first to third anchor arrays will be described in more detail with reference to FIGS. 20 and 21.

Figure 20:
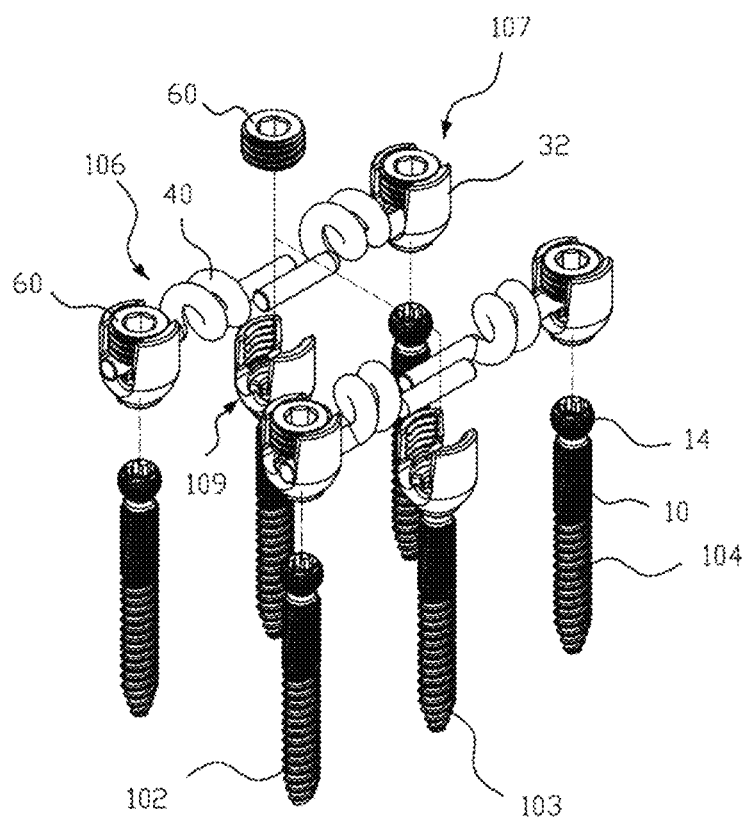
FIG. 20 is a detailed disassembled perspective view of FIG. 11 showing the single rod head module arrays of the present invention, both coupled to the first to third anchor arrays.
Figure 21:
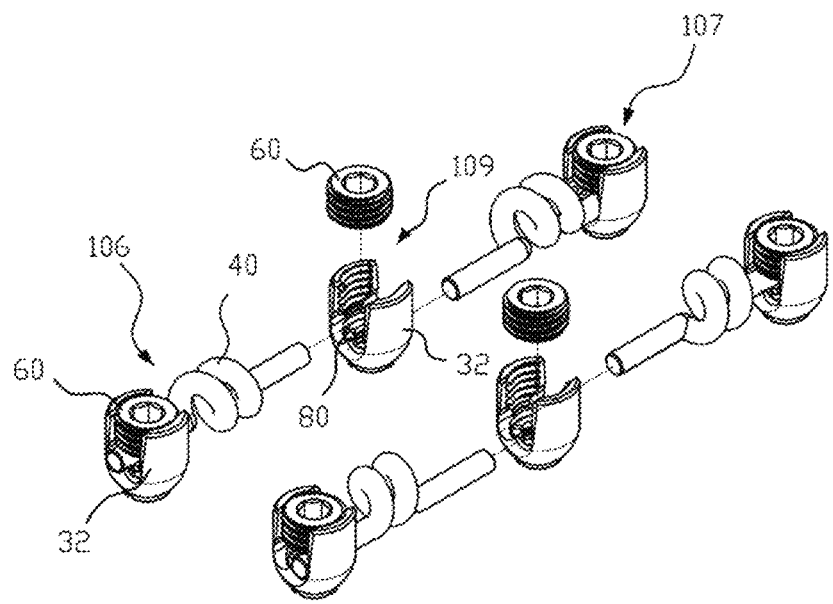
FIG. 21 is a disassembled perspective view of FIG. 20 showing the arrangement structure of the single rod bead module arrays according to the present invention.

FIG. 20 is a detailed disassembled perspective view of FIG. 11 showing the single rod head module arrays of the present invention, both coupled to the first to third anchor arrays. FIG. 21 is a disassembled perspective view of FIG. 20 showing the arrangement structure of the single rod head module arrays according to the present invention. As shown in FIGS. 20 and 21, each rod 40 of the first and second single rod head modules 106 and 107—assembled in vitro prior to surgery—is alternately connected to the first, second, and third anchor arrays 102, 103, and 104, which are arranged for spinal implantation. A hollow common head module 109 is fitted onto the second anchor array 103, and each rod 40, 40' of the first and second single head modules 106 and 107 is subsequently secured to the first and second U-shaped grooves of the hollow common head module 109 using setscrews 60.

The double rod head module 108 illustrated in FIG. 12 is modularized by seating the two rods 40 and 40' in the two U-shaped grooves 36 of the single housing 30 in opposite directions, fixing the rods 40 with predetermined directions and angles of the coil parts 44, and then pressing and fixing the rods 40 while fastening the set screw 60 to the accommodation portion 32. The double rod head module 108, which is assembled as described above, naturally fixes the spine by being aligned in accordance with the shape of the spine as the spherical body 14 of the anchor 10 is fitted into the spherical body hole 38a of the inner lock 38. Further, the housings 32', in which the rod is not seated at two opposite sides of the double rod head module 108, are fitted with the first and third anchor arrays 102 and 104, and the rod 40 of the double rod head module 108 is seated in and connected to one of the two U-shaped grooves 36 of the accommodation portion.

The method of connecting the double rod head module to the first to third anchor arrays will be described in more detail with reference to FIG. 22.

Figure 22:
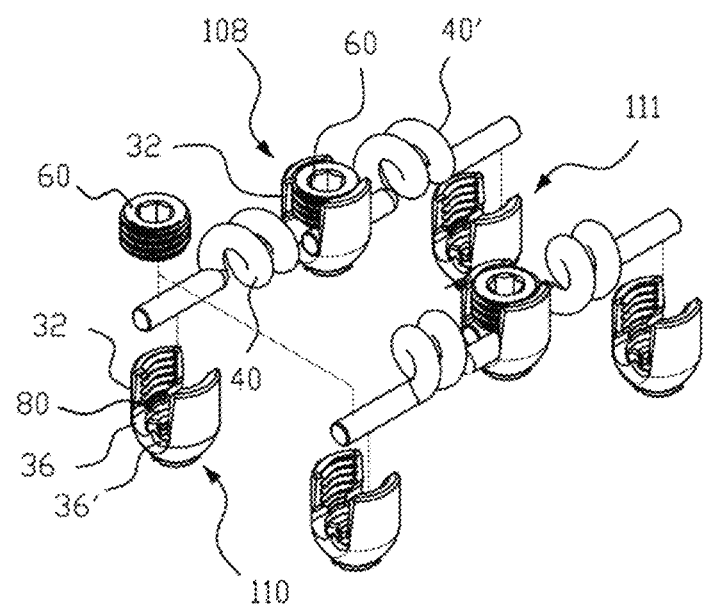
FIG. 22 is a detailed disassembled perspective view of FIG. 12 showing the arrangement structure of the double rod head module arrays according to the present invention.

FIG. 22 is a detailed disassembled perspective view of FIG. 12 showing the arrangement structure of the double rod head module arrays according to the present invention.

As shown in FIG. 22, both rods 40 and 40' of a double head module 108, assembled in vitro prior to surgery, are connected to the second anchor array 103, which is arranged for spinal implantation. First and second hollow head modules 110 and 111 are fitted to the first and third anchor arrays 102 and 104, and both rods 40 and 40' of the double head module 108 are subsequently secured within one of the first and second U-shaped grooves of the respective hollow head modules 110 and 111 using a setscrew 60.

According to the present invention configured as described above, after small skin incision is performed before the main operation, the guide wire is inserted into the vertebral body, the guide wire is fitted into the hollow hole 12a of the anchor body 12, and then the anchor 10 is inserted into the vertebral body 204. In this process, it is possible to identify whether an angle or direction is incorrect and to adjust the anchor 10 while identifying a depth by which the anchor 10 is inserted.

When the anchor 10 is inserted into the segment of the vertebral body 204 before the main operation, the single rod head module 106 or the double rod head module 108, which is seated in the U-shaped groove of the housing with a predetermined direction and a preset gradient angle of the coil part 44 of the rod 40, is assembled to the anchor 10 exposed to the outside of the vertebral body, such that the process of fixing the pedicle screw is completed.

With this process, the process of fixing the pedicle screw is accurately and simply performed only by fitting the head module 30 prepared in vitro with the anchor 10. Therefore, the surgery time is significantly reduced. In addition, because only the anchor 10 is inserted into the vertebral body, minimum skin incision is performed, and the amount of bleeding is reduced. In particular, only a surgical position (a position into which the anchor is to be inserted) is identified and guided from a pedicle photograph derived through a C-ARM, such that the pedicle screw may be accurately installed.

During the process of fixing the spinal implant assembly by using the detachable head module, the fixing process of allowing the coil parts 44 of the rods 40 disposed at the two opposite sides based on the centerline of the human body to be symmetrically maintained without tilting toward one side is also naturally achieved.

The direction and angle of the coil part 44 of the eccentric rod 40 are aligned in a line without a process of forcibly bending the rod in the state in which the rods are constantly and symmetrically disposed based on the centerline of the human body. Therefore, it is possible to maintain natural sagittal balance and lordosis.

In general, a high pressure appears on the front side of the disc in the case of flexion motion, and a high pressure appears on the rear side of the disc in the case of extension motion. In the case of neutral, it is common that the pressure on the front and rear sides of the disc appears at a similar level.

If the head module 30 of the present invention is coupled to the anchor 10 in the state in which the direction and gradient of the rod 40 are adjusting correctly, due to the characteristics in which the coil part 44 is wound around the center with a constant eccentricity d from the center of the straight part 42 of the rod 40, a uniformly unloading effect with a similar pattern of the overall graph appears even though the pressure value is slightly reduced compared to the normal disc pressure profile.

In addition, the spine does not move by only one specific segment, but the motion of each segment is combined to perform motions such as flexion and extension as a whole. Conventionally, the motion of each segment is called a range of motion (ROM), which is a result of a general spinal biomechanical analysis that the ROM of the operated segment is relatively small, and the ROM of the upper and lower adjacent parts of the operated segment is larger. Therefore, the acceleration of adjacent segment degeneration above and below the operated segment is also caused by these unnatural mechanical motions of the spine.

According to the structure of the head module 30 of the present invention, having the rod 40 fixed to the housing 32 in a state that the straight part 42 and the coil part 44 are configured to have a central eccentricity and a specific inclination, the rod 40 operates in such a way that the movement during flexion, which is a motion of bending the waist forward, is larger and the movement is smaller when extension, which is a motion of straightening the waist backward, such that the result similar to the actual biomechanical movement of the spine is derived.

According to the present invention, compared to surgery using a rigid rod, the ROM of the operated segment is relatively maximized and the adjacent segment ROM is minimized. In addition, as a result of finite element analysis of a case in which the bio-flexible spinal fixation apparatus of the present invention is mounted on the posterior portion of the spine between the segments of the spine 500 and the interbody fusion cage is used in the anterior portion of the spine, it was demonstrated that the load sharing ratio between the anterior portion and the posterior portion approaches the normal load sharing mechanism ratio as a ratio of 7:3 or 7.5:2.5. As a result, it is possible to minimize the adjacent segment degeneration above and below the operated segment.

In a spinal load bearing experiment with the structure of the present invention, in the case of semi-rigid fixation, a ratio of the anterior and posterior portions is similar to that in the normal load distribution. Therefore, it is possible to not only reduce a likelihood of reoperation caused by the adjacent segment degeneration (ASD), but also reduce the pain by stiff (flat) back syndrome. It is also possible to shorten the postoperative rehabilitation period.

The specific embodiments of the present invention have been described. However, it can be naturally understood by those skilled in the art, to which the present invention pertains, that the spirit and scope of the present invention are not limited to the specific embodiments, and various modifications and alterations may be made within the scope of not changing the gist of the present invention.

DESCRIPTION OF REFERENCE NUMERALS

10: Anchor
12: Body
14: Spherical body
16: Neck portion
30: Detachable head module
32: Housing
34: Accommodation portion
35: Through-hole
36: U-shaped groove
38, 80: Inner lock
40: Rod
42: Straight part
44: Coil part
46: Single rod washer
48: Double rod washer
60: Set screw
82: Cylindrical body
84: Concave surface
86: Cut-out groove
88: Bridge plate
90: Internal thread groove
92: Rim
202: Guide wire
204: Vertebral body
a: Upper section screw thread
b: Lower section screw thread

What is claimed is:

1. A spinal implant having a detachable head module, the spinal implant comprising:

an anchor including a body having a screw thread formed on an outer peripheral surface thereof, a hollow hole penetrated through the body in an axial direction, and a spherical body positioned at an upper end of the body and having a fixing groove, the anchor being configured to be percutaneously inserted into a vertebral body through skin;

a housing including an accommodation portion opened in a transverse direction and having a screw thread formed on an inner peripheral surface thereof, a plurality of U-shaped grooves formed in a bottom surface of the accommodation portion, and a seating hole penetrated through a lower center of the housing;

an inner lock including a cylindrical body tapered to fit into the seating hole of the housing, a concave surface formed in a central region of an outer peripheral surface of the cylindrical body and having a reduced thickness than a thickness of the cylindrical body to provide an elastic force, a cut-out groove formed at a predetermined angle in the cylindrical body, a bridge plate located at a lower end of the cut-out groove, the bridge plate having a thickness reduced relative to that of the cylindrical body, and being configured to withstand a predetermined torque during assembly of a head module, and to fracture when torque equal to or greater than the predetermined torque is applied to a set screw during secondary assembly to the spherical body of the anchor; and a rim formed on a lower end surface of the cylindrical body such that the rim is concave inward;

a rod including a pair of straight parts seated in the U-shaped grooves of the housing, and a coil part wound at a particular angle relative to a centerline that is eccentrically spaced apart from a centerline of the straight part by a predetermined distance, being seated in the U-shaped groove of the housing in an orientation in which a direction and gradient thereof are adjustable; and a set screw configured to secure the rod by being fastened into the accommodation portion of the housing, wherein the head module is configured by assembling the set screw in a state in which the inner lock is seated in the seating hole of the housing and the rod is seated to the U-shaped grooves of the housing.

2. The spinal implant of claim 1, further comprising:
a single washer having an inverted U-shaped groove sized to accommodate a spherical surface of the straight part of the rod and formed at one side of a bottom surface thereof, and a spherical protrusion sized to be accommodated in the U-shaped groove of the accommodation portion of the housing and formed at the other side of the bottom surface thereof, wherein the single washer being placed on an upper portion of the U-shaped groove of the accommodation portion of the housing.

3. The spinal implant of claim 1, further comprising:
a double washer having inverted U-shaped grooves sized to accommodate a spherical surface of the straight part of the rod respectively and formed in a bottom surface thereof and configured to correspond to the U-shaped grooves of the housing,
wherein the double washer being placed on an upper surface of the straight parts of the rods mounted on the U-shaped grooves of the accommodation portion of the housing.

4. The spinal implant of claim 1, wherein a certain gap is formed between the inner bottom surface of the seating hole of the housing and the outer lower surface of the inner lock to provide sufficient clearance for mating space in which the spherical body of the anchor is inserted into the sphere hole of the inner lock.

5. The spinal implant of claim 1, wherein an internal thread groove is formed in an inner peripheral surface of the spherical body hole of the inner lock, and an external thread is formed on an outer peripheral surface of the spherical body, such that a coupling frictional force is maximized when the spherical body is fitted into the spherical body hole.

6. The spinal implant of claim 1, wherein the anchor has a dualized screw thread structure in which a pitch of an upper section screw thread is small and a pitch of a lower section screw thread is large so that bondability with the vertebral body is maximized.

7. The spinal implant of claim 6, wherein a self-tapper groove is formed in the screw thread of the anchor and serves as a passageway through which bone remnants are smoothly discharged when the anchor is inserted into a bone while rotating.

8. The spinal implant of claim 1, wherein the fixing groove formed in the spherical body of the anchor is a hexagonal wrench groove.

9. The spinal implant of claim 1, wherein the straight parts at two opposite sides of the rod each have a flat surface having a flat upper portion to set a reference fixing position at which the rod is fixed to the groove.

10. The spinal implant of claim 9, wherein when the rod is fixed in a state in which the flat surface of the rod is directed upward, the coil part automatically stands with a gradient of about $31.7°±5°$ with respect to a centerline of the straight part, and the coil parts of the two opposite left and right sides rods are configured to be symmetrically fixed at two opposite sides based on a centerline of a human body.

11. The spinal implant of claim 1, wherein a cross-sectional diameter of a section of the straight part of the rod is larger than a cross-sectional diameter of a section of the coil part of the rod.

12. An assembly of a spinal implant having a detachable head module, the assembly comprising:
first, second, and third anchor arrays, each including:
a body having a screw thread formed on an outer peripheral surface thereof, and a hollow hole penetrated through the body in an axial direction, and a spherical body positioned at an upper end of the body and having a fixing groove, the anchors being configured to be percutaneously inserted into segments of a vertebral body through skin;
first and second single rod head modules and a hollow common head module configured to continuously connect the first to third anchor arrays,
wherein the first and second single rod head modules including:
a housing that has an accommodation portion opened in a transverse direction and having a screw thread formed on an inner peripheral surface thereof, first and second U-shaped grooves configured parallel to each other in a bottom surface of the accommodation portion, and a seating hole penetrated through a lower center of the housing; an inner lock that has a cylindrical body tapered so as to be fitted into the seating hole of the housing, a concave surface formed in a central portion section of an outer peripheral surface of the cylindrical body and having a thickness smaller than a thickness of the cylindrical body to provide a sufficient elastic force, a cut-out groove formed at a predetermined angle in the cylindrical body, a bridge plate formed at a lower end of the cut-out groove and having a thickness reduced relative to that of the cylindrical body, and a rim formed on a lower-end surface of the cylindrical body so as to be concave inward and wherein the inner lock fitted into the seating hole of the housing and having a spherical body hole sized to accommodate the spherical body of the anchor;
a rod that has a straight parts seated within one of the first and second U-shaped grooves of the housing and a coil part wound to be inclined at a particular angle with respect to a center eccentrically spaced apart from a center of the straight part at a predetermined distance, wherein the rod is seated to the groove of the housing in a state in which a direction and gradient thereof are adjusted; and a set screw configured to fix the rod while being fastened to the accommodation portion of the housing; and
wherein the hollow common head module including:
a housing that has an accommodation portion opened in a transverse direction and having a screw thread formed on an inner peripheral surface thereof, first and second U-shaped grooves configured parallel to each other in a bottom surface of the accommodation portion, and a seating hole penetrated through a lower center of the housing; an inner lock including a cylindrical body tapered so as to be fitted into the seating hole of the housing, a concave surface formed in a central portion section of an outer peripheral surface of the cylindrical body and having a thickness smaller than a thickness of the cylindrical body to provide a sufficient elastic force, a cut-out groove formed at a predetermined angle in the cylindrical body, a bridge plate formed at a lower end of the cut-out groove and having a smaller thickness of the cylindrical body, and a rim formed on a lower-end surface of the cylindrical body so as to be concave inward and wherein the inner lock fitted into the seating hole of the housing and having a spherical body hole sized to accommodate the spherical body of the anchor; and a set screw configured to fix the rod while being fastened to the accommodation portion of the housing,
wherein the first and second single rod head modules are coupled to the spherical body of the first and third anchor arrays, while the hollow common head module is coupled to the second anchor array and wherein the rods of the first and second single rod head modules are seated in the first and second U-shaped grooves of the hollow common head module respectively.

13. The assembly of claim 12, wherein the coil parts of the rods of the first and second single rod head modules coupled to the anchors of the first to third anchor arrays are configured to be symmetrically positioned at two opposite sides of a spine based on a centerline of a human body.

14. The assembly of claim 12, further comprising;
a single rod washer having an inverted U-shaped groove sized to accommodate the straight part of the rods of the first and second single rod head modules and formed at one side of a bottom surface thereof, and a spherical protrusion sized to be accommodated in the U-shaped groove and formed at the other side of the bottom surface thereof, wherein the single rod washer being placed on an upper portion of the U-shaped grooves of the first and second single rod head modules;
a double rod washer having inverted U-shaped grooves sized to accommodate the straight part of the rods of the first and second single rod head modules and formed in a bottom surface thereof, while corresponding to the U-shaped grooves of the housing of the hollow common head module, wherein the double rod washer being placed on an upper portion of the U-shaped grooves of the hollow common head module.

15. An assembly of a spinal implant having a detachable head module, the assembly comprising:
first, second, and third anchor arrays, each including:
a body having a screw thread formed on an outer peripheral surface thereof, and a hollow hole penetrated through the body in an axial direction, and a spherical body positioned at an upper end of the body and having a fixing groove, the anchors being configured to be percutaneously inserted into segments of a vertebral body through skin;
a double rod head module and first, second hollow head modules configured to continuously connect the first to third anchor arrays,
wherein the double rod head module including:
a housing that has an accommodation portion opened in a transverse direction and having a screw thread formed on an inner peripheral surface thereof, first and second U-shaped grooves configured parallel to each other in a bottom surface of the accommodation portion, and a seating hole penetrated through a lower center of the housing; an inner lock that has a cylindrical body tapered so as to be fitted into the seating hole of the housing, a concave surface formed in a central portion section of an outer peripheral surface of the cylindrical body and having a thickness smaller than a thickness of the cylindrical body to provide a sufficient elastic force, a cut-out groove formed at a predetermined angle in the cylindrical body, a bridge plate formed at a lower end of the cut-out groove and having a thickness reduced relative to that of the cylindrical body, and a rim formed on a lower-end surface of the cylindrical body so as to be concave inward and wherein the inner lock fitted into the seating hole of the housing and having a spherical body hole sized to accommodate the spherical body of the anchor; rods that have straight parts seated alternately in opposite direction onto the first and second U-shaped grooves of the housing and coil parts wound to be inclined at a particular angle with respect to a center eccentrically spaced apart from a center of the straight part at a predetermined distance, wherein the rods are seated to the first and second U-shaped groove of the housing in a state in which a direction and gradient thereof are adjusted; and a set screw configured to fix the rod while being fastened to the accommodation portion of the housing; and
wherein the first and second hollow head modules including:
a housing that has an accommodation portion opened in a transverse direction and having a screw thread formed on an inner peripheral surface thereof, first and second U-shaped grooves configured parallel to each other in a bottom surface of the accommodation portion, and a seating hole penetrated through a lower center of the housing; an inner lock including a cylindrical body tapered so as to be fitted into the seating hole of the housing, a concave surface formed in a central portion section of an outer peripheral surface of the cylindrical body and having a thickness smaller than a thickness of the cylindrical body to provide a sufficient elastic force, a cut-out groove formed at a predetermined angle in the cylindrical body, a bridge plate formed at a lower end of the cut-out groove and having a smaller thickness of the cylindrical body, and a rim formed on a lower-end surface of the cylindrical body so as to be concave inward and wherein the inner lock fitted into the seating hole of the housing and having a spherical body hole sized to accommodate the spherical body of the anchor; and a set screw configured to fix each straight part of the both rods of the double head module seated in the first and second U-shaped grooves of the housing respectively,
wherein the first and second hollow head modules are coupled to the spherical body of the first and third anchor arrays, while the double rod head module is coupled to the second anchor array and
wherein the both rods of the double rod head module are seated in either the first or second U-shaped groove of the respective first and second hollow head modules.

16. The assembly of claim 15, wherein the coil parts of the rods of the double rod head module coupled to the anchors of the first to third anchor arrays are configured to be symmetrically positioned at two opposite sides of a spine based on a centerline of a human body.

17. The assembly of claim 15, further comprising;
a single rod washer having an inverted U-shaped groove sized to accommodate the straight part of the both rods of the double head module and formed at one side of a bottom surface the first and second hollow head modules, and a spherical protrusion sized to be accommodated in the U-shaped groove and formed at the other side of the bottom surface thereof, wherein the single rod washer being placed on an upper portion of the U-shaped grooves of the first and second hollow head modules;
a double rod washer having inverted U-shaped grooves sized to accommodate the straight part of the both rods of the double head module and formed in a bottom surface thereof, while corresponding to the U-shaped grooves of the housing of the double rod head module, wherein the double rod washer being placed on an upper portion of the U-shaped grooves of the double rod head module.

* * * * *